(12) United States Patent
Adriano et al.

(10) Patent No.: US 6,484,210 B1
(45) Date of Patent: Nov. 19, 2002

(54) PACKET PROCESSING RELAY AGENT TO PROVIDE LINK LAYER FORWARDING IN ONE-WAY CABLE/WIRELESS/SATELLITE MODEMS

(75) Inventors: Richard Adriano, San Diego, CA (US); Poornima Lalwaney, San Diego, CA (US); Yong Ho Son, Palo Alto, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/179,812

(22) Filed: Oct. 27, 1998

Related U.S. Application Data

(60) Provisional application No. 60/065,054, filed on Nov. 10, 1997.

(51) Int. Cl.[7] .......................... G06F 15/16; G06F 15/173
(52) U.S. Cl. ........................ 709/239; 709/236; 709/219; 725/109; 725/110; 725/111; 725/120
(58) Field of Search ........................... 370/432; 709/227, 709/218, 239, 236, 219; 713/201; 725/111, 114, 109, 110, 120

(56) References Cited

U.S. PATENT DOCUMENTS

| 5,488,412 A | * | 1/1996 | Majeti et al. ................ 725/111 |
| 5,534,913 A | * | 7/1996 | Majeti et al. ................ 725/114 |
| 5,978,381 A | * | 11/1999 | Perlman et al. ............. 370/432 |
| 6,041,356 A | * | 3/2000 | Mohammed ................ 709/227 |
| 6,052,819 A | * | 4/2000 | Barker et al. ............... 714/776 |
| 6,070,246 A | * | 5/2000 | Beser .......................... 713/201 |

FOREIGN PATENT DOCUMENTS

| EP | 0 854 599 | 7/1998 |
| WO | WO 95/34153 | 12/1995 |
| WO | WO 98/18247 | 4/1998 |

OTHER PUBLICATIONS

E. J. Hernandez–Valencia, "Architectures for Broadband Residential IP Services Over CATV Networks", IEEE Inc., New York, vol. 11, No. 1, XP 000679054, pp. 36–43 (1997) (8 pages).

* cited by examiner

Primary Examiner—Robert B. Harrell
Assistant Examiner—Paul Kang
(74) Attorney, Agent, or Firm—Barry R. Lipsitz; Douglas M. McAllister

(57) ABSTRACT

A method and apparatus for allowing a personal computer to receive data from a computer network such as the Internet via a broadcast channel of a cable or satellite television network, while transmitting data upstream to the computer network via a telephone line. A packet processing relay agent (PPRA) forwards data at the data link layer between a one-way network adapter, such as a cable modem that receives Internet data via a cable network, and a two-way return path adapter, such as a telephone modem that communicates with Internet servers and other users via a telephone network. The system provides compatibility with TCP/IP routing/addressing conventions by forwarding upstream IP packets with a cable modem source address over the telephone modem. The PPRA can enhance functionality by incorporating higher layer functions at the data link layer.

28 Claims, 6 Drawing Sheets

PACKET PROCESSING RELAY AGENT TO PROVIDE LINK LAYER FORWARDING IN ONE-WAY CABLE/WIRELESS/SATELLITE MODEMS

This application claims the benefit of U.S. provisional patent application serial No. 60/065,054, filed Nov. 10, 1997.

BACKGROUND OF THE INVENTION

The present invention relates to a method and apparatus for allowing a personal computer to receive data from a computer network such as the Internet via a broadcast channel, e.g., of a cable or satellite television network, while transmitting data upstream to the computer network via a telephone line.

The following acronyms are used:

ARP—Address Resolution Protocol;
CPU—Central Processing Unit;
DHCP—Dynamic Host Configuration Protocol;
HTTP—Hyper Text Transport Protocol;
IETF—Internet Engineering Task Force;
IETF—Internet Engineering Task Force;
IGMP—Internet Group Management Protocol;
IP—Internet Protocol;
IPCP—Internet Protocol Configuration Protocol;
ISP—Internet Service Provider;
LAN—Local Area Network;
LMDS—Local Multi-point Distribution System;
MMDS—Multi-channel Multi-point Distribution System;
MSO—Multiple Systems Operator;
PC—Personal Computer;
PPP—Point-to-Point Protocol;
PPRA—Packet Processing Relay Agent;
RF—Radio Frequency;
RFC—Request For Comments;
TCP—Transmission Control Protocol;
UDP—User Datagram Protocol;
UHF—Ultra High Frequency; and
WAN—Wide Area Network.

Existing cable television networks deliver digital television signals to users' homes via coaxial cable, or hybrid fiber and coaxial cable networks. Additionally, satellite distribution networks that transmit programs directly to a user's home have also gained increased popularity. The digital signals transmitted to the user provide high-fidelity video and audio. Other types of data can also be transmitted to the user, such as closed captioning data, stock data, weather reports and the like. This data may be modulated onto an entire television signal channel, or a portion of the television signal channel, such as the vertical blanking interval, and recovered at a decoder in the user's home.

Additionally, some cable networks provide an upstream communication path that allows a user to transmit signals to the headend, for example, to order pay-per-view programming, or to check on an account balance.

Furthermore, computer networks such as the Internet are growing rapidly in popularity, particularly among the general public who use the Internet for entertainment, educational, and informational purposes, and to communicate with other users. A user typically accesses the Internet via a PC and a telephone modem via a conventional duplex telephone line to download graphics, text and even audio and video data from various remote servers. Users may also communicate real-time with one another by transmitting data from a sender's PC to the receiver's PC. Thus, data is transmitted to and from the PC via the two-way telephone modem.

An important difference between telephone and cable or satellite television networks is bandwidth. Because telephone networks were built to carry only voice signals, the bandwidth is very limited, e.g., 3 KHz. In contrast, cable television and satellite networks are designed to deliver full-motion video and, as a result, have a much greater bandwidth, e.g., several hundred MHz or more.

Accordingly, the provision of Internet data services and the like on a cable or satellite network would be highly desirable due to the increased bandwidth available. Such an arrangement would greatly speed the response to the user's PC, while providing additional marketing opportunities for cable and satellite network operators.

However, the provision of an upstream path is not feasible for satellite or terrestrial broadcast networks, including UHF, MMDS and LMDS. Moreover, many cable television networks are not configured for upstream communications, or any such provisioning may be limited and not suitable for handling transmissions from a larger number of users. In particular, network operators may prefer to maintain the available upstream path for significant revenue-enhancing activities such as pay-per-view orders.

Furthermore, since the cable/satellite channel is a broadcast channel, and the telephone line is a point-to-point channel, communication and addressing protocols that are available on a PC do not work seamlessly in the cable/satellite broadcast environment. Moreover, the communication and addressing protocols of a computer network are generally incompatible with cable and satellite television equipment.

Accordingly, it would be desirable to provide a system that allows a PC to receive data from a computer network such as the Internet via a downstream broadcast channel of a cable, satellite or terrestrial broadcast television network, while transmitting data to the computer network via an upstream telephone line. The system should provide compatibility with the routing/addressing conventions of the protocols stack used by the computer network.

In addition, the system should be designed so that packets with a cable modem source address are not rejected by the telephone network. Such rejection would occur if the telephone network provider uses anti-spoofing filters that reject packets with source addresses that are not recognized by the telephone network. Accordingly, the system should be designed to have the telephone network assigned source addresses on packets going through the telephone network.

The system should provide a logical path from a cable modem to a phone modem.

The system should provide a packet processing relay agent that implements functional enhancements including application level proxy, DHCP relay agent, IGMP proxy, IP encapsulation, IP filtering, data-link layer tunneling, data link layer filtering, and proxy ARP agents.

The present invention provides a system having the above and other advantages.

SUMMARY OF THE INVENTION

The present invention relates to a method and apparatus for allowing a personal computer, router/bridge or other device to receive data from a computer network such as the Internet via a broadcast channel of a cable, satellite or other terrestrial broadcast television network, while transmitting data upstream to the computer network via a telephone line. The invention thereby allows a user to quickly access and retrieve data from the computer network via a high bandwidth channel.

A particular method is presented for providing link layer forwarding from a one-way, receive-only adapter, such as a cable, satellite, terrestrial broadcast, or other wired or wireless modem, to the computer network using a two-way adapter, such as a telephone modem. Terrestrial broadcast systems, such as MMDS, employ line-of-sight terrestrial signals such as microwave signals. The one-way adapter receives data from a computer network via a first communication path, such as a cable television link or satellite link, and the two-way adapter receives data from, and sends data to, a service provider of the computer network via a second communication path, such as a telephone link. The service provider may be an ISP that allows a user to access a computer network such as the Internet.

A method for providing link layer forwarding from a one-way adapter to a two-way adapter includes the steps of: monitoring a data packet received at a data link layer driver of the one-way adapter, and determining whether the data packet is received from a higher protocol layer of the one-way adapter. The data packet is provided from the data link layer driver of the one-way adapter to the higher protocol layer if the data packet is not received from the higher protocol layer.

Essentially, if the data packet is not received from the higher protocol layer of the one-way adapter, it is likely received from a lower protocol layer, e.g., the physical layer comprising the one-way adapter. In this case, the data packet may include, for example, Internet data received via the first communication path.

The data packet is forwarded from the data link layer driver of the one-way adapter to a packet processing relay agent if the data packet is received from the higher protocol layer. The packet processing relay agent processes the data packet forwarded to it, then forwards the data packet to a data link layer driver of the two-way adapter. The data link layer driver of the two-way adapter provides the data packet for communication to the computer network via the service provider, e.g., by sending the packet upstream on the second communication path.

A further method in accordance with the present invention includes the steps of monitoring a data packet received at a data link layer driver of the two-way adapter, and determining whether the data packet is received from a higher protocol layer of the two-way adapter. The data packet is provided for communication to the computer network via the service provider if the data packet is received from the higher protocol layer.

The data packet is provided from the data link layer driver of the two-way adapter to the higher protocol layer if the data packet is not received from the higher protocol layer and is not addressed to the IP/network address of the one-way adapter. The data packet is forwarded from the data link layer driver of the two-way adapter to a packet processing relay agent if the data packet is not received from the higher protocol layer but is addressed to the IP/network address of the one-way adapter.

Essentially, if the data packet is not received from the higher protocol layer of the two-way adapter, it is received from a lower protocol layer, e.g., the physical layer comprising the two-way adapter. In this case, the data packet may include, for example, session initialization data received from the service provider.

The packet processing relay agent processes the data packet forwarded to it, then forwards the data packet to the data link layer driver of the one-way adapter.

The packet processing relay agent may process the data packet forwarded to it to provide functional enhancements including at least one of: application level proxy, DHCP relay agent, IGMP proxy, IP encapsulation, IP filtering, data-link layer tunneling, data-link layer filtering, and proxy ARP agent.

In one embodiment, in addition to the forwarding function, the packet processing relay agent processes the data packet forwarded to it by encapsulating the data packet as payload in a encapsulation packet. The encapsulation packet has a source address associated with the two-way adapter and a destination address associated with a decapsulation module. The decapsulation module may be at the cable operator's network, or between the phone network (e.g., ISP) and the computer network (e.g., Internet). This allows the encapsulation packet to be recognized by the service provider even though the source address of the one-way adapter is not recognized by the service provider.

The decapsulation module, which is typically associated with the cable operator's network, decapsulates the encapsulation packet to recover the data packet encapsulated therein. The recovered data packet has a destination address associated with a location in the computer network, and a source address associated with the one-way adapter. The recovered data packet is then forwarded to the location of the computer network, such as an Internet web site.

The packet processing relay agent is adapted to process the data packet forwarded to it to provide one or more of the functional enhancements mentioned above.

Corresponding apparatus structures are also presented.

DETAILED DESCRIPTION OF THE INVENTION

Figure 1:
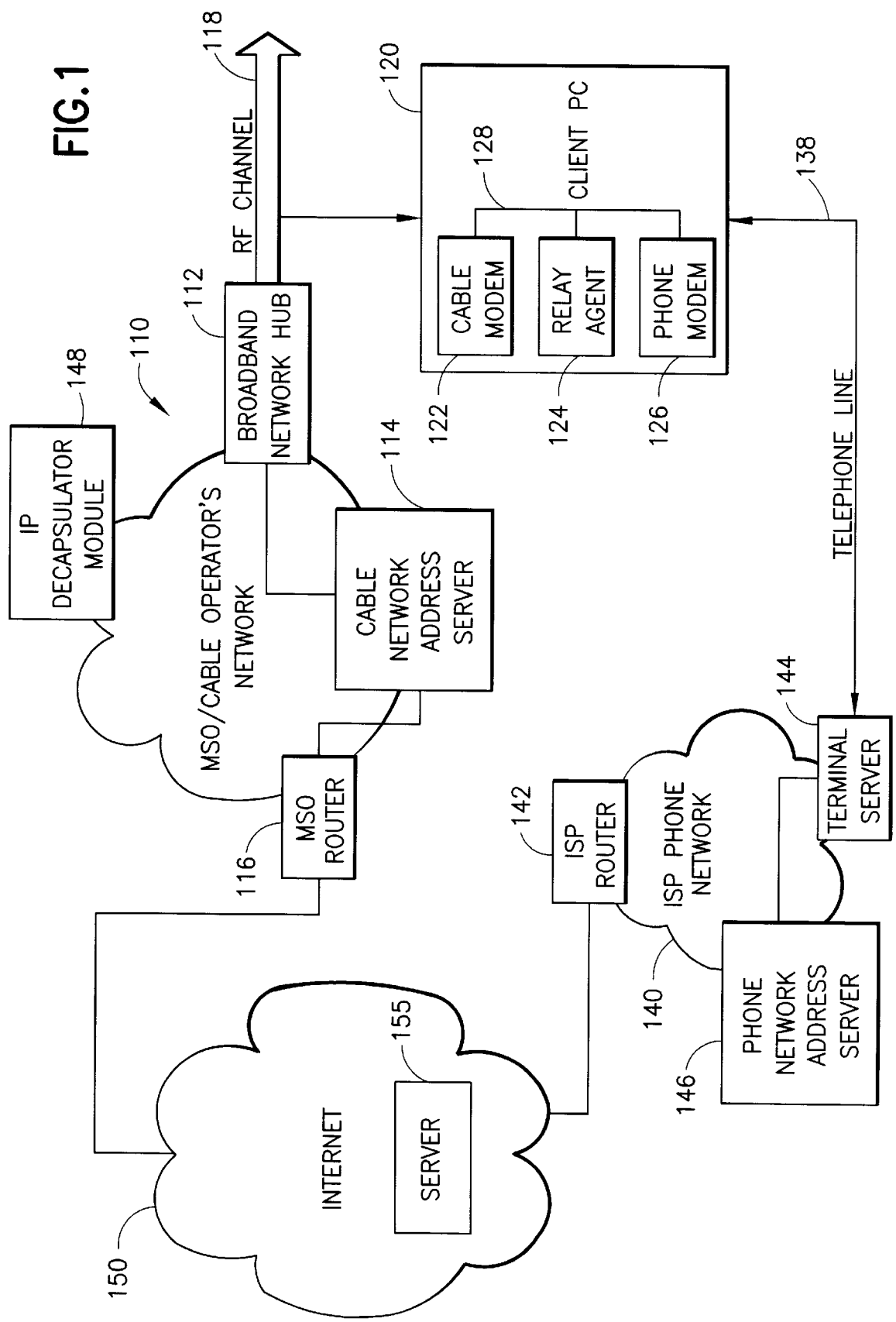
FIG. 1 illustrates a system architecture in accordance with the present invention.

The present invention relates to a method and apparatus for allowing a personal computer, router/bridge or other device to receive data from a computer network such as the Internet via a broadcast channel of a cable, satellite or other terrestrial broadcast television network, while transmitting data upstream to the computer network via a telephone line.

The term "computer network" is used herein to refer to any network, internet, the Internet, subnet or the like.

A protocol for communicating data in a computer network is often defined by a stack of protocol layers. Each layer performs a service for the next higher layer, and each layer's protocol is independent of the other layer's protocols. The services performed may include adding header and/or trailer information, setting a timer, or performing error detection and/or error correction, for example.

The lowest layer in the stack is the physical layer, which is a physical medium. Next, a data link layer, network layer, transport layer, and application layer may be provided. The application layer refers to software such as a browser operating on a PC. The transport layer enhances the reliability of the network layer by accounting for lost or errored packets, and allows a standard set of primitives to be used with different networks. The network layer chooses appropriate paths (e.g., links and routers) for communicating packets of data from a source to a destination, and allows communication between different types of networks. In particular, management of bandwidth in the different links and routers is provided. The data link layer accounts for framing of data packets (e.g., proper size of the data frame), error control, flow control, and error detection and correction. The physical layer, which may include copper wire or optical fiber, or a wireless path, is the medium over which data packets are communicated.

At the network layer, the data from the transport layer is provided as a packet, and a packet header may be added. At the data link layer, the data from the network layer is provided as a frame, and a frame header may be added. Processing of packets may be referred to at the data link layer, where it is understood that frames of packets are provided. Finally, at the physical layer, the frame is modulated onto a carrier for transmission across the physical medium.

Frames of data that are received by the destination machine are processed in a reverse order, e.g., from the physical layer to the data link layer, network layer, transport layer, and application layer.

In particular, the Internet typically uses a connection-oriented transport layer protocol known as TCP, and a network layer protocol known as IP. TCP service is established by having the sending and receiving machines create end points known as sockets. Each socket has a socket number or address that includes the IP address of the host and a 16-bit number local to the host, known as a port. Thus, TCP header includes a source port and a destination port. A connection is explicitly established between a socket on the sending machine and a socket on the receiving machine using socket calls.

However, TCP/IP stack difficulties are encountered when communicating data from a computer network to a PC or router/bridge device via a one-way broadcast network, where the return path is provided, e.g., by an upstream telephone link from the PC or router/bridge device to the computer network.

For example, for a cable modem system, the cable television plant may allocate a standard television channel (e.g., 6 MHz) to data transfer for Internet and multimedia services. A PC interfaces with the television plant (e.g., "broadcast plant") network via the cable modem using the same type of hook-up as a television. Once connected, the cable modem tunes to the channel set aside for data transfer to access the Internet and other multimedia services offered by the cable television operator.

The cable modem receives digital information carried over the television network and passes it through to the PC. Return signal communication from the PC at the customer premises to the Internet server is provided over an alternate path, such as a telephone connection.

Furthermore, in a "dual-homed" cable modem architecture, IP addresses for a cable modem and a telephone modem (e.g., return path adapter) are usually dynamically assigned and managed from different address pools. The cable modem and telephone modem are also known as "adapters". The term "dual-homed" refers to an architecture where there are two networks adapters in a single device, such as a PC, and different IP addresses are used for each of these adapters. The address of the phone adapter may be assigned using IPCP, while the address of the cable modem is typically assigned using a DHCP, for example.

In the dual-homing cable modem network architecture, due to the one-way nature of the cable television link, all upstream traffic is directed to the phone modem. Data sent from the Internet server to the PC should be addressed to the IP stack associated with the cable modem adapter. However, the packets going out of the phone adapter usually have the IP address associated with the phone adapter. This arrangement violates the routing/addressing conventions of most client TCP/IP stacks.

FIG. 1 illustrates a system architecture in accordance with the present invention. The architecture includes a MSO/cable operator's network 110, a client PC 120, which may be located at a user's home, an ISP phone network 140 (e.g., switching facility), and a computer network 150 such as the Internet. The MSO/cable operator's network 110 includes a MSO router 116 for communicating with the Internet 150, a cable network address server 114 for assigning DHCP address to different cable modems served by the network 110, and a broadband network hub 112 that provides data on an RF channel 118 to a population of cable modems. An IP decapsulator module 148 may also be associated with the cable operator's network 110.

Optionally, the IP decapsulator module 148 may be provided between the ISP phone network 140 and the Internet 150.

The RF channel may be a cable link, e.g., comprising optical fiber and/or coaxial cable, or a wireless network, such as a satellite link, or a MMDS link. Note that the RF channel 118 can also broadcasts television signals and other data to a decoder population in a conventional manner. The present invention is compatible with existing broadcasting and receiving equipment.

The PC 120, which could alternatively be a router/bridge device connected to one or more PCs in a home, e.g., in a LAN, includes a one-way cable modem 122 (e.g., one-way adapter), a packet processing relay agent 124 in accordance with the present invention, and a phone modem 126 (e.g., two-way adapter). The phone modem 126 includes transmit and receive capabilities, while the cable modem 122 is receive-only. A communication path 128 allows communication between these elements. The cable modem 122 and phone modem 126 may be provided as internal or external cards of the PC, for example. The relay agent 124 may be implemented in software, firmware, and/or hardware in the PC 120 or in a device external to the PC 120. The modem 122 may be used with cable, satellite, MMDS, LMDS, UHF or other signals, for example.

Note that the PC 120 includes conventional hardware components such as a CPU and memory, that may provide control signals to the cable modem 122 and phone modem 126 as well as implement the functions of the relay agent 124.

The ISP phone network 140 receives data from the phone modem 126 via a telephone line 138. The ISP phone network 140 includes a terminal server 144, phone network address server 146, and an ISP router 142 that connects the ISP phone network 140 to the Internet 150. The Internet 150 includes a representative server 155 that stores data for retrieval by the PC 120.

The PPRA 124 is a data link layer forwarding entity that may be used in one-way systems where data is received through one interface but is sent out through a different return path interface. Additional transport, network or link layer processing may be included in the packet processing agent, transparent to the higher layers in the protocol stack.

The PPRA 124 looks at all packets received from the protocol stack bound to a one-way adapter. In the illustrated embodiment, the one-way adapter is the cable modem 122, which only receives downstream information from the cable television network 114 via the RF channel 118. In addition, the relay agent 124 monitors all packets sent to, and received from, the return path adapter, which in the illustrated embodiment is the phone modem 126. At a minimum, the PPRA 124 forwards packets at the data link layer from the one-way adapter 122 to the return path adapter 126.

In some cases, routers on the telephone return network, such as ISP router 142, may reject packets if the source address of the packets is not from networks they manage. For example, if a packet has a source address corresponding to the cable modem 122, it will not be recognized by the ISP router 142, and is therefore dropped (discarded) at the ISP router 142. However, a packet with a source address from the phone modem 126 will be recognized, and is permitted to traverse from the ISP network 140 to the Internet 150. The ISP router 142 uses an anti-spoofing filter to filter out packets that are not recognized. Additionally, the source addresses on recognized packets are those addresses previously assigned by the phone network address server 146

Data-link layer or network layer tunneling protocols can be used to circumvent such an anti-spoofing filter. Tunneling allows communication between source and destination hosts that are on different networks which are of the same type, but are separated by a network with a different type. With tunneling, an entire packet is carried in the payload data field of another packet.

The tunnels defined over the data link layer (Layer 2, Point-to-Point Tunneling Protocol "PPTP", Layer 2 Tunneling Protocol "L2TP") and the network layer (Layer 3, IP tunneling) are two-way tunnels. As the cable modem network architecture is asymmetrical with respect to routing, an IP tunneling scheme, such as that defined in IETF RFC 2003, may be partially implemented on the cable modem system.

The invention implements a one-way tunnel in the upstream direction, through the ISP phone network 140, e.g., from the PC 120 to the IP decapsulator 148 in the MSO/cable operator's network 110. At the network layer, the source address in the outer IP header of each packet is the IP address that is addressed to the PPP adapter, or the IP address of the phone modem 125. The destination address in the header is that of the IP decapsulator module 148. When an anti-spoofing filter is used at the ISP router 142, all outgoing packets from the cable modem stack are encapsulated as discussed before being sent out of the phone adapter 126 by an IP encapsulation function implemented in the PPRA 124.

As mentioned, the address of the phone modem 126 is assigned using the IPCP, while preferably the address of the cable modem 122 is assigned using a DHCP. Network provisioning using DHCP requires bi-directional communication with the DHCP cable network address server 114 through the adapter that needs the configuration parameters, e.g., the cable adapter 122.

Figure 2:
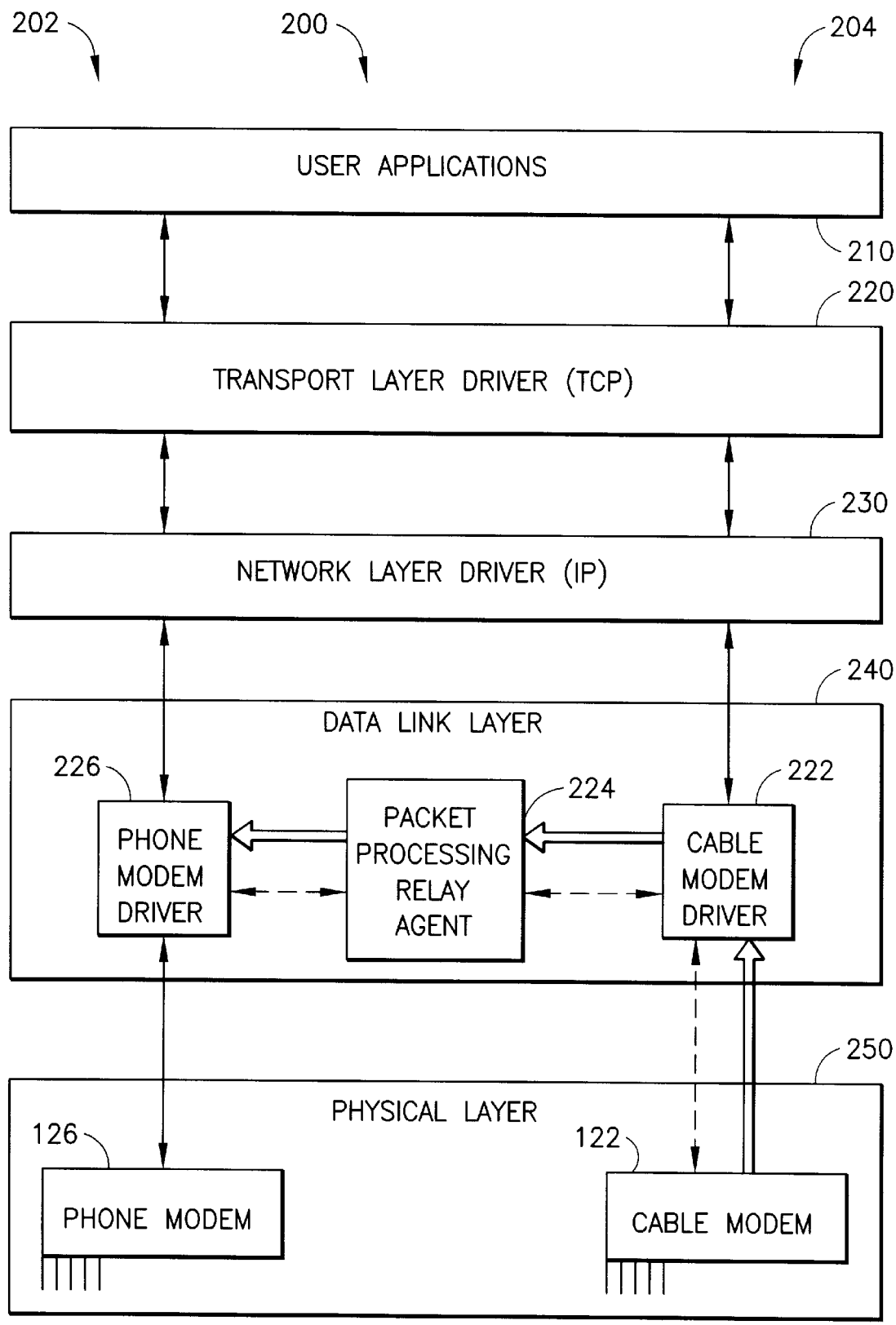
FIG. 2 illustrates a protocol stack in accordance with the present invention.

FIG. 2 illustrates a protocol stack in accordance with the present invention. The stack 200, representing the protocol of the PC 120, includes user applications 210 (e.g., such as an Internet browser running on a PC), a transport driver layer 220, e.g., using TCP, a network drive layer 230, e.g., using IP, a data link layer 240, and a physical layer 250.

The data link layer 240 includes a phone modem driver 226, a PPRA 224, and a cable modem driver 222. The physical layer includes the phone modem 126 and cable modem 122. The PC receives data via the receive-only cable modem 122, and sends and receives data via the phone modem 126. For example, a user may enter a request at the user application layer 210 to view a web page at a web site on the Internet. In this case, processing flows from the user application layer 210, to the transport layer driver 220, to the network layer driver 230, to the cable modem driver, to the relay agent 224, to the phone modem driver 226, and finally to the phone modem 126. Note that the cable modem driver 222 sends the user request to the relay agent 224 instead of the cable modem 122. The phone modem 126 then uses the telephone link to forward a message to the phone network. The message is then routed to the appropriate Internet server based on its destination address.

The server 155 receives the request for the appropriate web page, typically according to the HTTP. The server 155 sends the requested information back to the PC 120 at the IP address associated with the cable modem adapter 122. Specifically, the requested information is sent to the MSO/cable operator's network, and is then sent over the RF channel 118 and received by the cable modem 222. Processing for this data flows from the cable modem 122, to the cable modem driver 222, to the network layer driver 230, to the transport layer driver 220, and finally to the user application layer 210, where it is processed by the browser and displayed on the PC's screen.

Initially, when the PC 120 wishes to establish a connection with the ISP phone network 140 of FIG. 1, a session initialization must occur.

Firstly, the phone modem 126 needs to connect with the terminal server 144 and obtain an IP address that is then assigned to the TCP/IP stack associated with the phone modem. Information exchanged between the PC and the ISP phone network 140 during session initialization includes connection request and connection indication primitives.

At this point, two-way communication with servers on the Internet is possible over the phone link. Next, the cable modem stack needs to be initialized. This means that the cable modem needs to obtain its IP address and network configuration information. Since the cable modem 122 is a one-way, receive-only adapter, this request for information is sent out through the phone modem adapter 126 using the PPRA 124.

In response to the request, the IP address for the cable modem and network initialization information from the cable network address server 114 is received at the phone modem adapter 126 via the Internet 150 and the ISP phone network 140. Once the cable modem stack is initialized, all data communicated to the cable modem stack is received at the cable modem 122 and does not come through the phone modem 126.

Once a connection has been established for the PC, for upstream communication from the cable modem stack to the Internet, packets are forwarded at the data link layer 240 from the cable modem driver 222 to the phone modem driver 226 via the PPRA 124. The packets are then provided from the phone modem driver 226 to the return path adapter (e.g., phone modem) 126, and transmitted upstream to the ISP phone network 140. Additional processing of packets to augment application, transport, network and data-link layer functions can be included in the PPRA 224. Functional enhancements that can be implemented in the PPRA include application level proxy, DHCP relay agent, IGMP proxy, IP encapsulation, IP filtering, data-link layer tunneling and filtering and proxy ARP agents.

Note that the stack 200 may be considered to conceptually represent a phone modem stack 202 on the left-hand side, and a cable modem stack 204 on the right-hand side. In the data link layer 240, the PPRA 224 may be considered an interface between the phone modem stack 202 and the cable modem stack 204 at the data link layer.

Generally, in FIG. 2, the dashed lines represent possible data flow during initialization, while the thick lines represent possible data flow in a normal Internet access run mode of the cable modem, following initialization. The path between the phone modem driver 226 and the phone modem 126 is bi-directional at all times, and can therefore carry both initialization data and Internet data as required.

Figure 3:
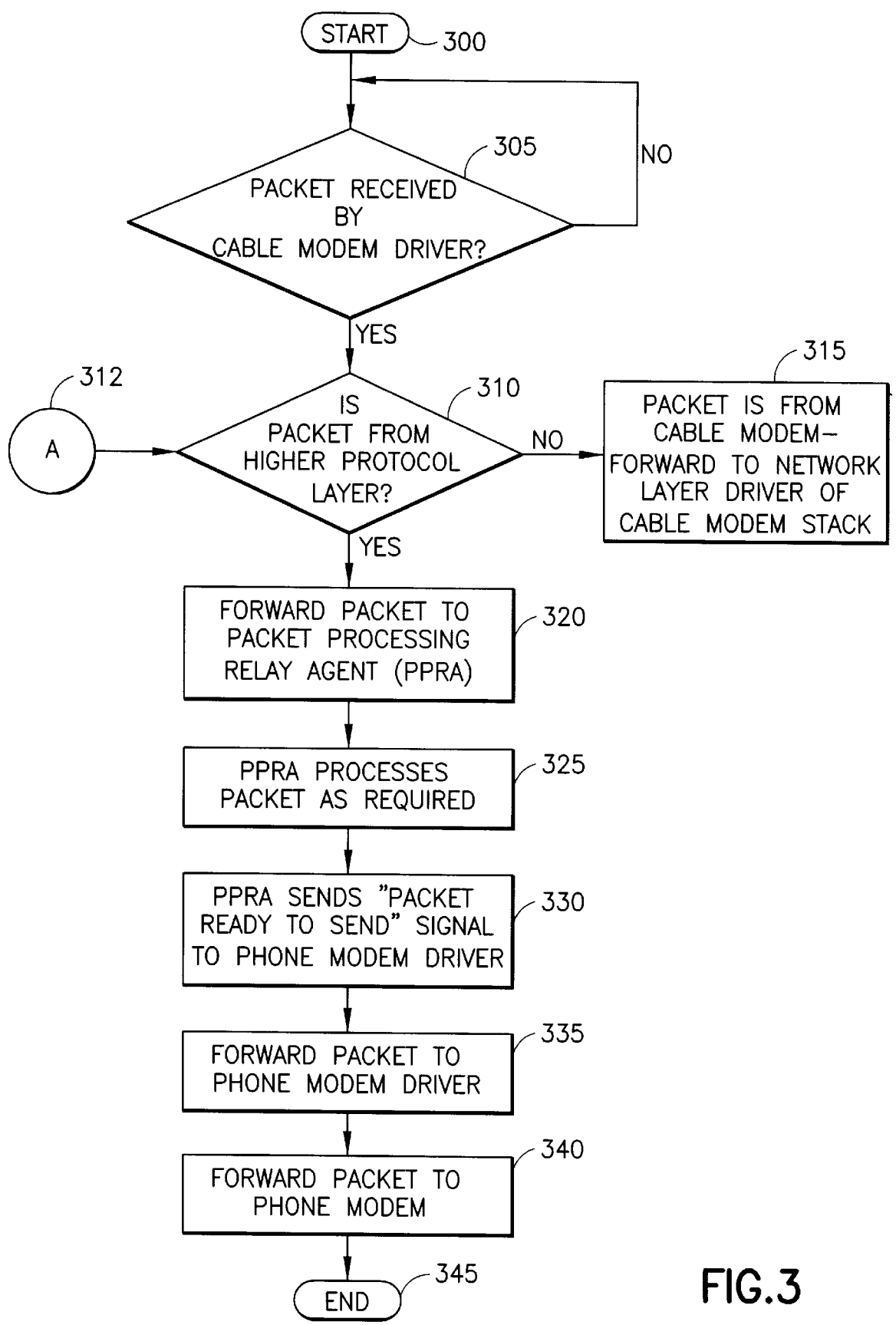
FIG. 3 illustrates a process flow for a cable modem driver in accordance with the present invention.

FIG. 3 illustrates a process flow for a cable modem driver in accordance with the present invention. Processing begins at box 300. At box 305, a determination is made as to whether a packet is received by the cable modem driver. If so, processing proceeds at box 310, where a determination is made as to whether the packet is from a higher protocol layer. Processing may also proceed at box 310 via "A" 312 from FIG. 4 for packets received by the cable modem driver 222 from the PPRA 224.

Note that data received by the cable modem driver from the PPRA (e.g., from "A" 312) may include session initialization data for establishing a session with the Internet. Moreover, DHCP transactions at session initialization of the cable modem require two-way communication with the cable network address server 114. The initialization data is sent from the cable network address server 114 to the phone modem interface, and is intended to be sent to the cable modem stack.

If the packet is not from a higher protocol layer, the packet is from the cable modem 122 at the lower, physical layer in the cable modem stack 204. In this case, at box 315, the packet is forwarded upward to the network layer driver and subsequent higher layers in the cable modem stack 204. The data received by the cable modem driver 222 from the cable modem 122 is the data, such as a web page, sent over the downstream channel of a cable television plant (e.g., RF channel 118), satellite broadcast link, or other channel.

If the packet is from a higher protocol layer (e.g., layers 210, 220, or 220), at box 320, the packet is forwarded to the PPRA. At box 325, the PPRA processes the packet as required. This processing may include encapsulation or decapsulation, or any of the functional enhancements referred to previously. Once processing is complete at the PPRA 224, at box 330, the PPRA sends a "packet ready to send" signal to the phone modem driver 226. At box 335, the packet is forwarded to the phone modem driver, and at box 340, the packet is forwarded from the phone modem driver 226 to the phone modem 126. The packet is then ready for transmission upstream on a telephone link. Processing terminates at box 345.

Figure 4:
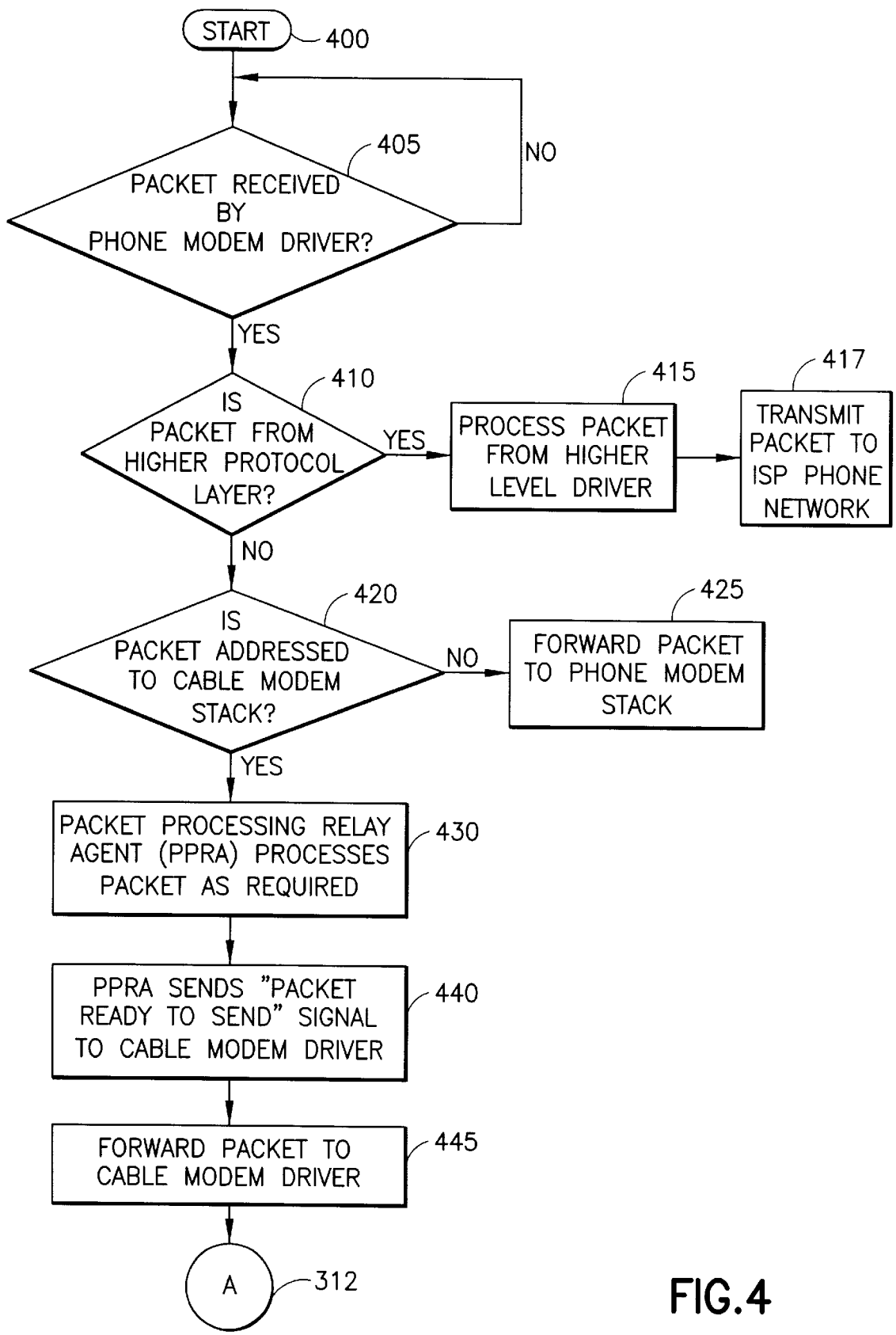
FIG. 4 illustrates a process flow for a phone modem driver in accordance with the present invention.

FIG. 4 illustrates a process flow for a phone modem driver in accordance with the present invention. The process flow begins at box 400. At box 405, a determination is made as to whether a packet is received by the phone modem driver 226. Recall that frames comprising several packets are processed by the phone modem driver at the data link layer. If a packet is present, a determination is made at box 410 as to whether the packet is from a higher protocol layer. If so, at box 415, the packet is from a higher level driver in the phone modem protocol stack (such as the network layer driver 230). The packet is then processed as required. The packet may subsequently be transmitted to the ISP phone network 140 via a telephone link at box 417.

If the packet is not from a higher level in the phone modem protocol stack, at box 420 a determination is made as to whether the packet is addressed to the cable modem stack. If not, at box 425, the packet is forwarded upward in the phone modem stack. For example, the packet intended for the phone modem stack may include session initialization data for the phone modem.

If the packet is addressed to the cable modem stack, at box 430, the packet is processed by the PPRA as required. This processing can include encapsulation or decapsulation, or any of the other functional enhancements referred to above. For example, the packet intended for the cable modem stack may include session initialization data for the cable modem. Communication of data to the cable modem stack via the phone modem driver will typically occur during the initialization phase of the cable modem stack. Once the system is initialized and the network is operational, communications from the Internet to the cable modem occur via the broadcast RF channel and not via the phone modem.

When processing is completed at the PPRA, at box 440, the PPRA sends a "packet ready to send" signal to the cable modem driver. At box 445, the packet is forwarded to the cable modem driver, and processing continues at "A" 312 in FIG. 3.

Figure 5:
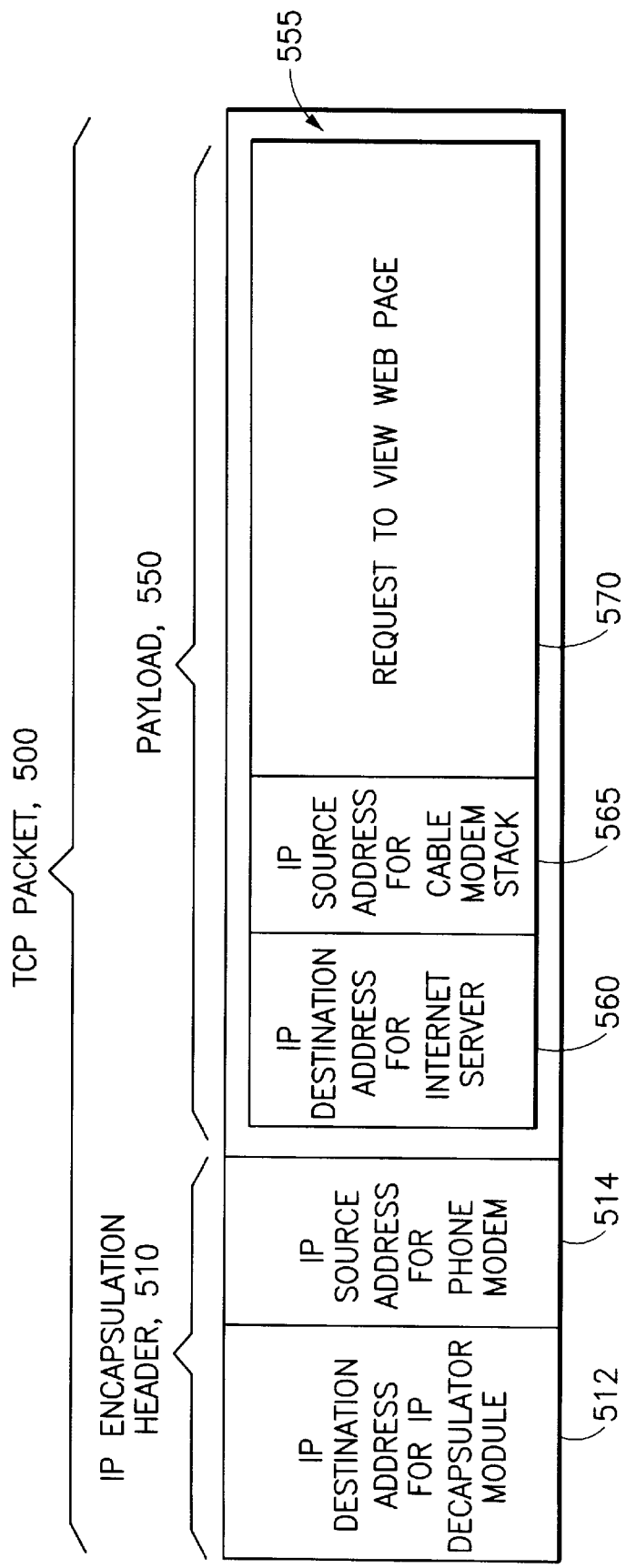
FIG. 5 illustrates a packet that is transmitted from a phone modem to an IP decapsulator at an ISP phone network in accordance with the present invention.

FIG. 5 illustrates a packet that is transmitted from a phone modem to an IP decapsulator at an ISP phone network in accordance with the present invention. A TCP or UDP packet 500 (e.g., encapsulation packet) includes an IP encapsulation header 510 and a payload 550. Note that the packet 500 is shown in a simplified form, as various other fields such as a checksum field and a sequence number field are not shown.

The IP encapsulation header 510 includes an IP destination address for an IP decapsulator module 512, and an IP source address for the phone modem 514. The payload 550 carries another entire TCP packet 555, which includes an IP destination address for an Internet server 560 (or other location in a computer network), an IP source address for a cable modem stack 565, and a payload 570, such as data requesting to view a web page for the particular Internet server in the destination address 560. Here, the TCP packet 555 is tunneled within the TCP packet 500. This configuration circumvents the anti-spoofing filters used by telephone networks.

Specifically, a telephone network employing anti-spoofing filters would not recognize the IP source address for the cable. modem stack 565 since the cable modem is not part of the telephone network. However, the telephone network will recognize the IP source address for the phone modem 514, since the phone modem is part of the telephone network. When the TCP packet 500 is received by an IP decapsulator module 148 (FIG. 1), the packet 555 is extracted and routed to the server 155 identified by the IP address 560.

Note that if anti-spoofing filters are not used by the ISP phone network 140, the packet 555 may be transmitted directly without tunneling.

When the Internet server 155 of FIG. 1 receives a request to view a particular web page, the server transmits the web page as HTML data according to the IP source address for the cable modem stack 565 of FIG. 5. This IP source address 565 designates that the MSO router 116 should receive the requested web page or other data.

Figure 6:
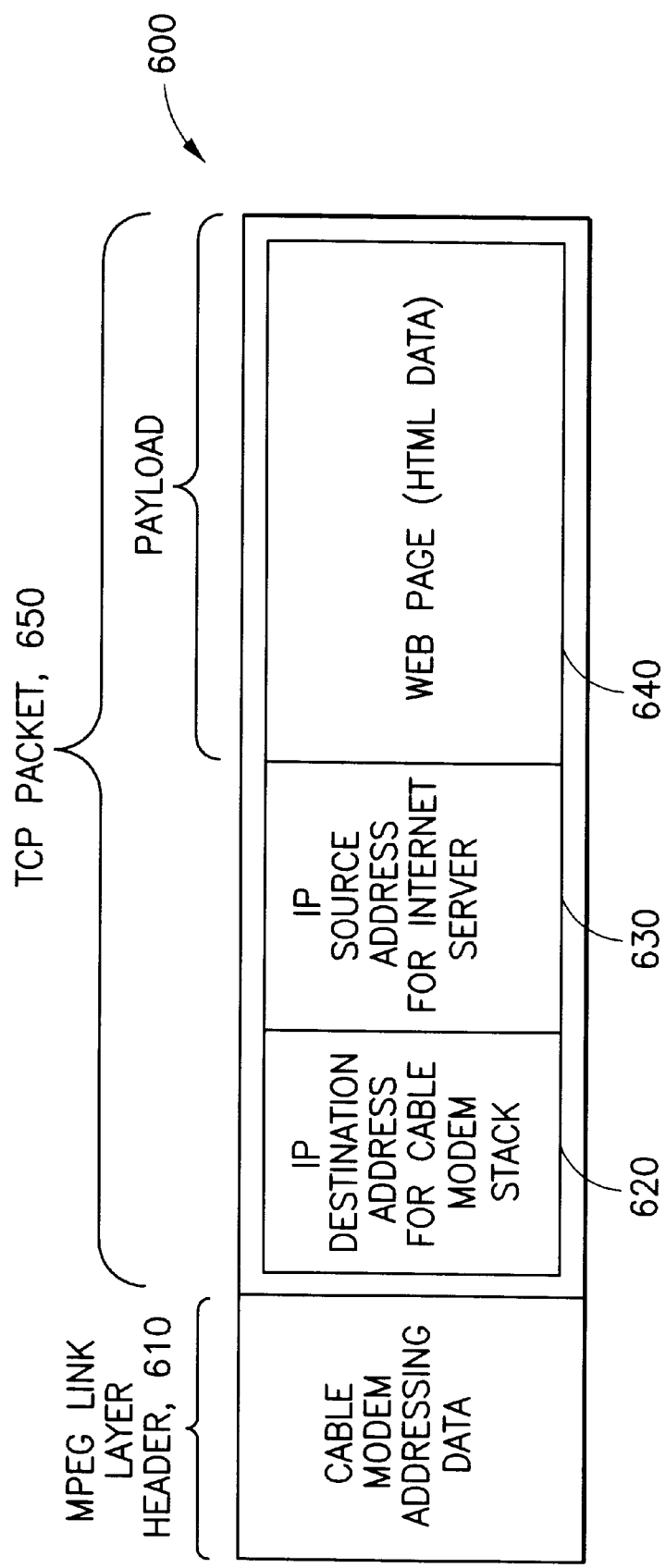
FIG. 6 illustrates a packet that is transmitted from a cable operator's network to a cable modem in accordance with the present invention.

FIG. 6 illustrates a packet that is transmitted from a cable operator's network to a cable modem in accordance with the present invention. The web page or other Internet data is transmitted from the server 155 to the MSO router 116 as a TCP/IP packet 650, which includes the IP destination address for the cable modem stack 620, the IP source address of the Internet server 630, and a payload portion 640 comprising the requested web page data or other data.

When the TCP packet 650 is received by the MSO router 116, it is forwarded to the broadcast network hub 112 since the IP destination address on the packet is that assigned to the cable modem on the downstream RF channel. The broadband network hub 112 transmits an overall data packet 600 that includes the TCP/IP packet 650 to the cable modem 122 via the RF channel 118 in an available channel allocation.

It should now be appreciated that the present invention provides a method of forwarding data between a one-way network adapter and a two-way return path adapter. The invention is not limited to use with cable television systems nor with telephone return paths. Any suitable one-way network adapter and two-way return path adapter can be linked using the PPRA disclosed herein.

Moreover, the term "one-way adapter" is meant to encompass an adapter that has only a one-way receive-only capability, as well as an adapter that has a two-way capability but is operating in a one-way mode.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for providing link layer forwarding from a two-way adapter to a one-way adapter, wherein said one-way adapter receives data from a computer network via a first communication path, and said two-way adapter receives data from, and sends data to, a service provider of said computer network via a second communication path, comprising the steps of:

monitoring a data packet received at a data link layer driver of said two-way adapter;

determining whether said data packet is received from a higher protocol layer of said two-way adapter;

providing said data packet for communication to said computer network via said service provider if said data packet is received from said higher protocol layer;

providing said data packet from said data link layer driver of said two-way adapter to said higher protocol layer if said data packet is not received from said higher protocol layer and is not addressed to a network layer address of said one-way adapter; and forwarding said data packet from said data link layer driver of said two-way adapter to a packet processing relay agent if said data packet is not received from said higher protocol layer and is addressed to the network layer address of said one-way adapter; wherein:
said packet processing relay agent is adapted to
process said data packet forwarded thereto to provide at least one functional enhancement and forward said enhanced data packet to said data link layer driver of said one-way adapter.

2. The method of claim 1, wherein:
said first communication path comprises at least one of a cable television link, a satellite television link, and a terrestrial broadcast television link.

3. The method of claim 1, wherein:
said one-way adapter comprises one of a cable television modem, satellite television modem, and a terrestrial broadcast television modem.

4. The method of claim 1, wherein:
said second communication path comprises a telephone link.

5. The method of claim 1, wherein:
said two-way adapter comprises a modem.

6. The method of claim 1, wherein said at least one functional enhancement includes at least one of:
application level proxy, Dynamic Host Configuration Protocol relay agent, Internet Group Management Protocol proxy, Internet Protocol encapsulation, Internet Protocol filtering, data-link layer tunneling, data-link layer filtering, and proxy Address Resolution Protocol agent.

7. A method for providing link layer forwarding from a one-way adapter to a two-way adapter, wherein said one-way adapter receives data from a computer network via a first communication path, and said two-way adapter receives data from, and sends data to, a service provider of said computer network via a second communication path, comprising the steps of:

monitoring a data packet received at a data link layer driver of said one-way adapter;

determining whether said data packet is received from a higher protocol layer of said one-way adapter;

providing said data packet from said data link layer driver of said one-way adapter to said higher protocol layer if said data packet is not received from said higher protocol layer;

forwarding said data packet from said data link layer driver of said one-way adapter to a packet processing relay agent if said data packet is received from said higher protocol layer; wherein:
said packet processing relay agent processes said data packet forwarded thereto by encapsulating said data packet as payload in an encapsulation packet;
said encapsulation packet has a source address associated with said two-way adapter and a destination address associated with a decapsulation module;
said packet processing relay agent is adapted to forward said encapsulation packet to a data link layer driver of said two-way adapter;
said data link layer driver of said two-way adapter is adapted to provide said encapsulation packet for communication to said computer network via said service provider;
said decapsulation module decapsulates said encapsulation packet to recover said data packet encapsulated therein;
said recovered data packet has a destination address associated with a location in said computer network, and a source address associated with said one-way adapter; and said recovered data packet is forwarded to said location of said computer network.

8. The method of claim 7, wherein:
said first communication path comprises at least one of a cable television link, a satellite television link, and a terrestrial broadcast television link.

9. The method of claim 7, wherein:
said one-way adapter comprises one of a cable television modem, a satellite television modem, and a terrestrial broadcast television modem.

10. The method of claim 7, wherein:
said second communication path comprises a telephone link.

11. The method of claim 7, wherein:
said two-way adapter comprises a modem.

12. The method of claim 7, wherein:
said location in said computer network is an Internet site.

13. The method of claim 7, wherein:
said decapsulation module is associated with one of: (a) said service provider, and (b) an operator's network that is associated with said first communication path.

14. The method of claim 7, wherein said packet processing relay agent is adapted to process said data packet forwarded thereto to provide functional enhancements including at least one of:
application level proxy, Dynamic Host Configuration Protocol relay agent, Internet Group Management Protocol proxy, Internet Protocol encapsulation, Internet Protocol filtering, data-link layer tunneling, data-link layer filtering, and proxy Address Resolution Protocol agent.

15. An apparatus for providing link layer forwarding from a two-way adapter to a one-way adapter, wherein said one-way adapter receives data from a computer network via a first communication path, and said two-way adapter receives data from, and sends data to, a service provider of said computer network via a second communication path, comprising:
a data link layer driver of said one-way adapter;
a data link layer driver of said two-way adapter for monitoring a data packet received thereat and determining whether said data packet is received from a higher protocol layer of said two-way adapter; and
a packet processing relay agent; wherein:
said data packet is provided for communication to said computer network via said service provider if said data packet is received from said higher protocol layer;
said data packet is provided from said data link layer driver of said two-way adapter to said higher protocol layer if said data packet is not received from said higher protocol layer and is not addressed to a network layer address of said one-way adapter;
said data packet is forwarded from said data link layer driver of said two-way adapter to said packet processing relay agent if said data packet is not received from said higher protocol layer and is addressed to said network layer address of said one-way adapter; and
said packet processing relay agent is adapted to process said data packet forwarded thereto to provide at least one functional enhancement and forward said enhanced data packet to said data link layer driver of said one-way adapter.

16. The apparatus of claim 15, wherein:
said first communication path comprises at least one of a cable television link, a satellite television link, and a terrestrial broadcast television link.

17. The apparatus of claim 15, wherein:
said one-way adapter comprises one of a cable television modem, a satellite television modem, and a terrestrial broadcast television modem.

18. The apparatus of claim 15, wherein:
said second communication path comprises a telephone link.

19. The apparatus of claim 15, wherein:
said two-way adapter comprises a modem.

20. The apparatus of claim 15, wherein said at least one functional enhancement includes at least one of:
application level proxy, Dynamic Host Configuration Protocol relay agent, Internet Group Management Protocol proxy, Internet Protocol encapsulation, Internet Protocol filtering, data-link layer tunneling, data-link layer filtering, and proxy Address Resolution Protocol agent.

21. An apparatus for providing link layer forwarding from a one-way adapter to a two-way adapter, wherein said one-way adapter receives data from a computer network via a first communication path, and said two-way adapter receives data from, and sends data to, a service provider of said computer network via a second communication path, comprising:
a data link layer driver of said two-way adapter;
a data link layer driver of said one-way adapter for monitoring a data packet received thereat and for determining whether said data packet is received from a higher protocol layer of said one-way adapter; and
a packet processing relay agent; wherein:
said data packet is provided from said data link layer driver of said one-way adapter to said higher protocol layer if said data packet is not received from said higher protocol layer;
said data packet is forwarded from said data link layer driver of said one-way adapter to said packet processing relay agent if said data packet is received from said higher protocol layer;
said packet processing relay agent processes said data packet forwarded thereto by encapsulating said data packet as payload in a encapsulation packet;
said encapsulation packet has a source address associated with said two-way adapter and a destination address associated with a decapsulation module;
said packet processing relay agent is adapted to forward said encapsulation packet to said data link layer driver of said two-way adapter;
said data link layer driver of said two-way adapter is adapted to provide said encapsulation packet forwarded thereto for communication to said computer network via said service provider;
said decapsulation module decapsulates said encapsulation packet to recover said data packet encapsulated therein;
said recovered data packet has a destination address associated with a location in said computer network, and a source address associated with said one-way adapter; and
said recovered data packet is forwarded to said location of said computer network.

22. The apparatus of claim 21, wherein:
said first communication path comprises at least one of a cable television link, a satellite television link, and a terrestrial broadcast television link.

23. The apparatus of claim 21, wherein:
said one-way adapter comprises one of a cable television modem, a satellite television modem, and a terrestrial broadcast television modem.

24. The apparatus of claim 21, wherein:
said second communication path comprises a telephone link.

25. The apparatus of claim 21, wherein:
said two-way adapter comprises a modem.
26. The apparatus of claim 21, wherein:
said location in said computer network is an Internet site.
27. The apparatus of claim 21, wherein:
said decapsulation module is associated with one of: (a) said service provider, and (b) an operator's network that is associated with said first communication path.
28. The apparatus of claim 21, wherein said packet processing relay agent is adapted to process said data packet forwarded thereto to provide functional enhancements including at least one of:

application level proxy, Dynamic Host Configuration Protocol relay agent, Internet Group Management Protocol proxy, Internet Protocol encapsulation, Internet Protocol filtering, data-link layer tunneling, data-link layer filtering, and proxy Address Resolution Protocol agent.

* * * * *